United States Patent [19]
Bruccoleri et al.

[11] Patent Number: 6,002,542
[45] Date of Patent: Dec. 14, 1999

[54] MAGNETIC DISC READ HEAD POSITIONING DEVICE AND METHOD

[75] Inventors: Melchiorre Bruccoleri, Genoa; Marco Demicheli, Binago-Como; Davide Demicheli, Pavia; Giuseppe Patti, Favara-Agrigento, all of Italy

[73] Assignee: SGS-Thomson Microelectronics S.r.l., Agrate Brianza, Italy

[21] Appl. No.: 08/904,599

[22] Filed: Aug. 1, 1997

[30] Foreign Application Priority Data

Aug. 7, 1996 [EP] European Pat. Off. ............. 96830448

[51] Int. Cl.⁶ .................................................. G11B 5/596
[52] U.S. Cl. ..................................... 360/77.11; 360/77.02
[58] Field of Search ............................. 360/77.11, 77.08, 360/77.07, 77.02, 77.01, 29; 318/560

[56] References Cited

U.S. PATENT DOCUMENTS

| | | | |
|---|---|---|---|
| 4,380,034 | 4/1983 | Krake | 360/77 |
| 4,833,551 | 5/1989 | Song | 360/77.05 |
| 5,483,393 | 1/1996 | Mento et al. | 360/77.08 |
| 5,801,896 | 9/1998 | Freitas | 360/77.08 |

FOREIGN PATENT DOCUMENTS

| | | |
|---|---|---|
| 0 221 740 | 5/1987 | European Pat. Off. . |
| 2 090 677 | 7/1982 | United Kingdom . |

OTHER PUBLICATIONS

Patent Abstract of Japan, of JP7201146 Head Positioning Control Device of Magnetic Disk Device and Method Thereor, Masahiko Aug. 4, 1995.

*Primary Examiner*—Andrew L. Sniezek
*Attorney, Agent, or Firm*—Jenkens & Gilchrist PC

[57] ABSTRACT

A servo-demodulator for a pair of alternating signals generated by a magnetic disc read head and indicative of the position of the read head in relation to the center of a recorded track. The servo-demodulator comprises a peak detector for successively and individually sampling the amplitude of each of a plurality of peaks of the pair of alternating signals, and a capacitor periodically connected to the output of the peak detector by a control logic for deriving a weighted average of the various successively sampled amplitudes. In this manner, the control logic obtains an averaged measure of amplitude with high immunity to noise.

10 Claims, 4 Drawing Sheets

MAGNETIC DISC READ HEAD POSITIONING DEVICE AND METHOD

FIELD OF THE INVENTION

The present invention relates to a precision servo-demodulator for providing the actuator which positions a read head of a rigid magnetic disc with the data necessary to maintain the correct alignment of the read/write head over the center of a track.

BACKGROUND OF THE INVENTION

It is known that magnetic discs are recorded with concentric circular tracks each divided into sectors, with each sector being provided with a read/write field called a header containing information defining which of the various tracks the sector belongs to and which sector among the various track sectors, and other information. In order to be able to obtain a high track density, and therefore a high disc capacity, and to ensure that data is correctly written to and read from a track, it is necessary to control the position of the head on the track and correcting it if the head is not exactly aligned on the track center.

To this end, in the header field of each sector two short successions of sinusoidal signals, called "servo bursts" of equal amplitude are recorded, one on either side of the track center, over separate arcs of the header field. If, during the course of a subsequent reading, the read head is correctly positioned over the track center, the previously effected recording induces two identical signals in the read head when the two separate arcs of the header field are read. Otherwise, the two signals differ in amplitude and provide an indication of the displacement of the head from the center of the track. This indication is utilized by a control system to correct the position of the head, aligning it on the center of the track.

The known techniques for measuring the displacement of the head from the track center to compare between the two signals read from the servo recording are essentially of two types:

1) Peak detection: the peak, that is, the maximum value of the signals provided by the head upon reading each of the two servo bursts, is memorized and compared with the other. This recognition method has the advantage of requiring relatively simple sampling and memory circuits and of being independent of the timing signals which activate the sampling operation (which must be activated only for reading the two servo bursts, and not when the other data is read). A serious disadvantage of this method is the low immunity to noise and therefore low precision. In fact, a disturbance which causes an increase, even of a single signal peak, contributes its amplitude integrally to the detection of an erroneous amplitude value of the peak. It is to be noted that in the case of signals provided by a read head (generally through a preamplifier) with asymmetrical characteristics, as is the case when the read head is of magnetoresistive type, two identical sampling circuits are necessary, respectively, for the recognition of the maximum positive peak and the maximum negative peak, which is converted into a positive peak with a simple inversion of the connection of the input terminals. The sum of the two measurements provides the peak-to-peak amplitude of the signal.

2) Area detection: This technique is based on the measurement of the area of the rectified signal. Although conceptually very simple, this technique, which involves an integration of the signal over a predetermined time interval, requires complex and expensive circuits. Moreover, the measurement precision depends on the precision with which the integration time interval is defined. The advantage of this technique, which has a high immunity to noise, is that it does not require circuit duplication in the case of asymmetric signals, but this only partly compensates for the above-mentioned disadvantages.

What is desired is a technique which is constructionally simple with a high immunity to noise without being influenced by imprecisions in the timing signal.

SUMMARY OF THE INVENTION

Accordingly, the present invention provides a servo-demodulator which, while being constructionally simple, has a high immunity to noise without being influenced by imprecisions in the timing signal.

The present invention provides a servo-demodulator for a pair of successive alternating variable signals, generated by a magnetic disc read head and indicative of the position of the read head on a recorded track on the disc, the signals of the pair having a plurality of positive peaks and a plurality of negative peaks. The servo-demodulator comprises a pair of input terminals for receiving the alternating variable signals and a detector for detecting the positive peaks of the signals of the pair. The detector is connected to the pair of input terminals and includes a first sample and hold capacitor and a first normally open reset switch closed by a reset pulse. The servo-demodulator also includes a means connected to the pair of input terminals for generating a first signal, the assertion of which defines a periodic time window for sampling each of the positive peaks and a second signal, the assertion of which defines a second periodic time window separate from the sampling window, containing one of the negative peaks. The servo-demodulator further comprises a second sample and hold capacitor and a second normally open switch for connecting the second capacitor in parallel with the first capacitor when closed by an averaging command signal. The servo-demodulator further comprises logic control means connected to the means for generating the first and second signal for receiving the first signal, the logic control means being activated by an asserted external signal indicative of the generation by the head of one of the pair of alternate variable signals, to produce the reset pulse at its output upon assertion of the first signal and the averaging command signal coasserted with a first assertion of the first signal and with the assertions of the second signal subsequent to two preceding assertions of the first signal.

The present invention also provides a servo-demodulator for a pair of asymmetrical successive alternating variable signals generated by a read head of a magnetic disc and indicative of the position of the read head on a magnetic record track, the signals of the pair having a plurality of positive peaks and a plurality of negative peaks. The servo-demodulator comprises a first servo-demodulator, a second servo-demodulator wherein the variable signals are applied through the pair of input terminals with a signal inversion relative to the application of the signals to the input terminals of the first servo-demodulator, and a third, normally open, switch closed by a control pulse for averaging the averages, for connecting the second capacitor of the first and second servo-demodulators respectively in parallel with one another. The servo-demodulator further comprises a means for generating the command pulse when the external signal is deasserted.

The servo-demodulator comprises a signal peak detector and other circuits which together detect the amplitude of each of the different signal peaks and takes a weighted average.

BRIEF DESCRIPTION OF THE DRAWINGS

The characteristics and advantages of the invention will become more clearly apparent from the following description, by way of non-limitative example, with reference to the attached drawings, in which.

DETAILED DESCRIPTION OF A PREFERRED EMBODIMENT OF THE INVENTION

Figure 1:
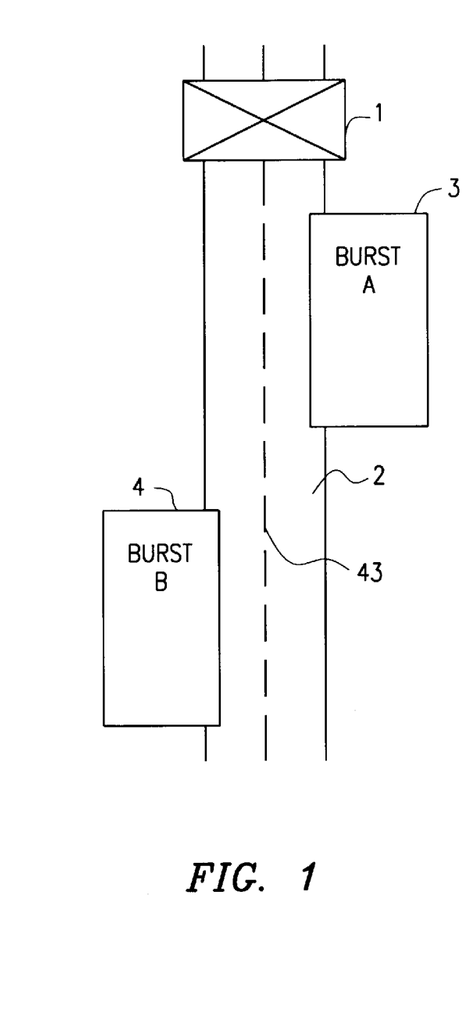
FIG. 1 is a schematic view of the relative arrangement of a read head on a read/write track portion of a magnetic disc, showing the "servo bursts" which are read by the head and utilized to identify the position of the head in relation to the track center.

Referring now to FIG. 1, a schematic view showing the relative disposition of a read head 1 on a read/write track 2 of a magnetic disc is illustrated.

For repetitive and reliable reading and writing of data, it is necessary that the read head be aligned on the track center 43. To identify the position of the read head on track 2, two short sequences of sinusoidal signals or "servo bursts" 3, 4 are pre-recorded on the disc, in the various header blocks of the track sectors, over separate arcs, respectively on one side and the other of the track center 43 at equal distances therefrom.

The recording of the two servo bursts 3, 4 involves the formation on the disc of two series of magnetic dipoles which for simplicity are also called BURST A and BURST B.

When, during its movement relative to the magnetic support, the read head 1 passes first over servo burst 3 and then over servo burst 4, two successive alternating variable electrical signals of sinusoidal form are induced in the head if the head is of inductive type, and being of only approximately sinusoidal form and asymmetrical if the head is of magnetoresistive type. The amplitude of the two signals depends on the position of the head with respect to track center 43.

Figure 2:
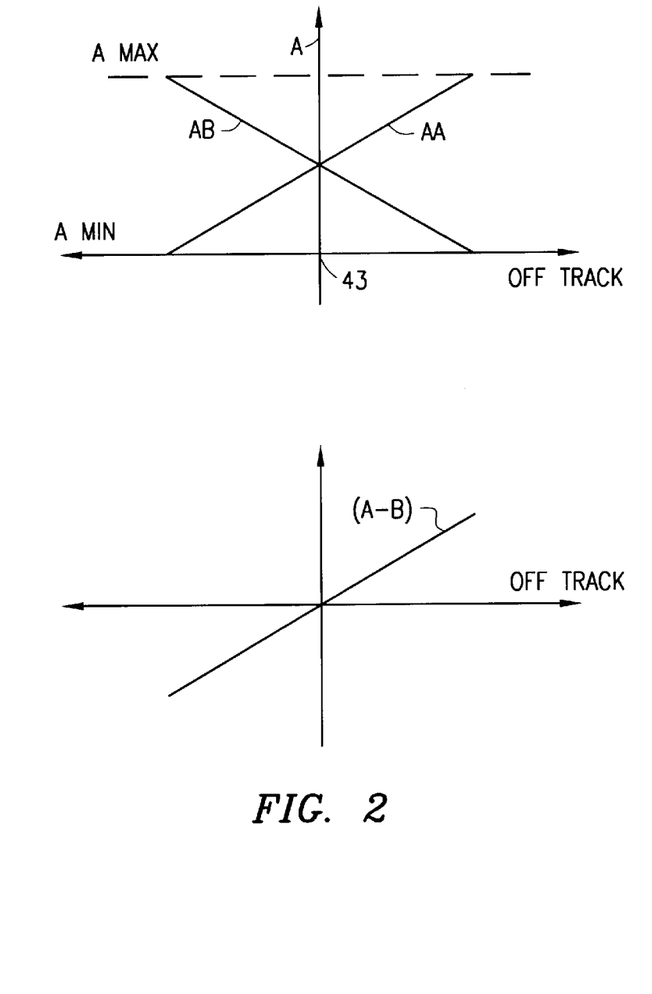
FIG. 2 is a Cartesian diagram schematically representing the amplitude of the pair of signals resulting from reading two "servo bursts" as a function of the offset of the head from the track center and the difference between the two signals.

Referring now to FIG. 2, the relationship of the amplitude of the signals resulting from reading two "servo bursts" to the offset (off-track) of head 1 to track center 43 will be described. It is evident that if read head 1 is centered on BURST A and therefore offset to the right with reference to FIG. 1, the amplitude of the read signal AA of BURST A is a maximum while the amplitude of signal AB read from BURST B is a minimum, practically nil. Correspondingly, if head 1 is centered on BURST B, the amplitude of the signal AA read from BURST A is a minimum while the amplitude of the signal AB read from BURST B is a maximum.

If the amplitude of the two signals, which are successive in time, is sampled, the difference between the two sampled amplitudes represented by diagram A-B of FIG. 2, provides an unequivocal indication of the offset of the head from track center 43 and can be used, preferably converted into a digital signal either before or after the subtraction operation, to control a servo actuator which correctly repositions head 1 on track center 43.

Figure 3:
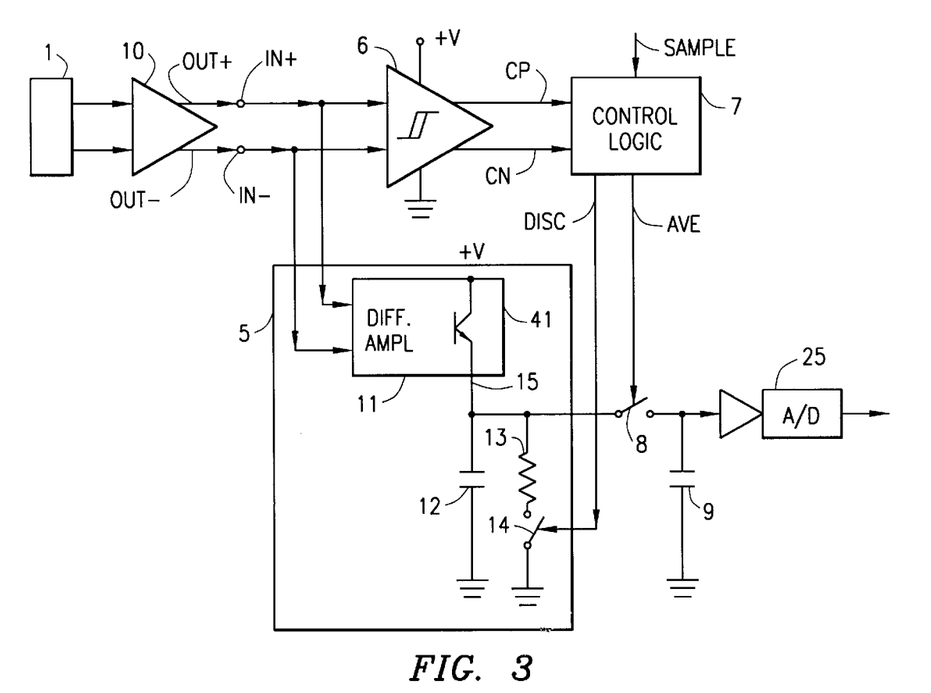
FIG. 3 is a partial block circuit diagram of a preferred embodiment of servo-demodulator in accordance with the present invention.

Referring now to FIG. 3, a partial block circuit diagram of a preferred embodiment of a servo-demodulator in accordance with the invention, which measures the amplitude of the two signals with multiple peak sampling and weighted average of the samples, consequently obtaining a high immunity to noise and high measurement precision, will be illustrated.

The servo-demodulator comprises a peak detector 5, a differential comparator 6 with hysteresis, control logic 7, an electronic switch 8 and a capacitor 9. The servo-demodulator, supplied by a positive voltage +V (for example, 5 V normally used in data processing systems but which could be 3.6 or 3.3 V according to current trends) has two inputs IN+, IN−, to receive the signal generated by a read head 1, conveniently preamplified by a preamplifier 10 and available between two outputs OUT+, OUT−. Typically the output signal from the preamplifier 10 resulting from reading the servo bursts is a short sequence of sinusoidal waves with positive peaks alternating with negative peaks, of relatively high frequency of the order of 10–30 MHZ and peak-to-peak amplitude of the order of 10/400 mV. The distinction between positive and negative peaks is purely conventional and depends on which of the terminals OUT+ and OUT− is considered as the reference.

In the case of read heads of inductive type, the read signal is symmetrical and perfectly sinusoidal. On the other hand, in the case of read heads of magnetoresistive type, the alternating read signal is asymmetrical and only approximately sinusoidal: the amplitude of the conventionally positive peaks available as positive voltages measured between the terminal OUT−, assumed as reference, and the terminal OUT+ is, in absolute value, greater than the amplitude of the negative peaks, available as negative voltages between the terminal OUT− and the terminal OUT+ and obviously available as a positive voltage between the terminal OUT+ taken as reference, and the terminal OUT−.

The input terminals IN+, IN− are respectively connected to the output terminals OUT+ and OUT−. The signal present between the input terminals IN+, IN− is applied to the input of the differential comparator 6 with hysteresis as well as to the peak detector 5. The term differential comparator with hysteresis is intended to mean a differential comparator which asserts a signal CP on a first output when the voltage supplied to the inputs exceeds a first predetermined value and which asserts a signal CN on a second output when the voltage applied to the inputs is less than a second predetermined value, possibly also negative.

A differential comparator with hysteresis can be constructed by a pair of differential comparators to which the same signal is supplied at input: the first comparator to assert an output signal (CP) when the input signal exceeds a first predetermined value and the second comparator to assert an output signal (CN) when the input signal is less than a predetermined value.

The asserted signal (CP) at the output from comparator 6 defines a first time window during which the signal applied to the input of the comparator exceeds a first predetermined value, and in which there is therefore contained a positive signal peak, and the asserted signal CN defines a second time window, separate from the first, and with no temporal superimposition therewith, during which the signal applied to the input of the comparator is less than a second predetermined value, in turn lower than the first, and in which there is therefore contained a negative signal peak.

Peak detector 5 is constituted, in a known way, by a differential amplifier 11, a capacitor 12 and a capacitor discharge circuit comprising a discharge current limiter resistor 13 in series with a switch 14. Output 15 from amplifier 11 is connected to one terminal of capacitor 12. The other terminal of capacitor 12 is connected to a ground reference. Advantageously, differential amplifier 11 includes an output stage with a transistor 41 in open emitter configuration, the emitter of which is directly connected to capacitor 12. The collector of transistor 41 receives its power supply (possibly through a current limiting resistor) from the supply voltage +V. In this way, the base-emitter junction of the output stage itself performs the function of the blocking diode normally provided in conventional peak detectors, which prevents discharge of the peak sampling capacitor 12 when the voltage of the input signal decreases from the peak value.

Output 15 of differential amplifier 11 is also connected, through switch 8, to one terminal of capacitor 9. The other terminal of capacitor 9 is connected to the ground reference. The closure of switch 8 connects capacitor 9 in parallel with capacitor 12 between output 15 of amplifier 11 and the common ground. Electronic switches 8 and 14, which are normally open, are closed respectively by the assertion of two commands AVE and DISC generated by control logic 7. Switches 8 and 14, as well as control logic 7, are preferably constituted by MOS transistors made with CMOS technology.

Control logic 7 is essentially a state machine activated by an asserted SAMPLE signal, generated externally to the servo-demodulator by a control unit, which, when asserted, indicates the transit of the "servo bursts" under read head 1. Control logic 7, if enabled by assertion of the SAMPLE signal, evolves as a function of the signals CP and CN applied to its input, generating the reset pulse DISC while the signal CP is asserted and asserting the signal AVE a first time with a first assertion of the signal CP and subsequently with the assertions of the signal CN after two preceding assertions of the signal CP.

Figure 4:
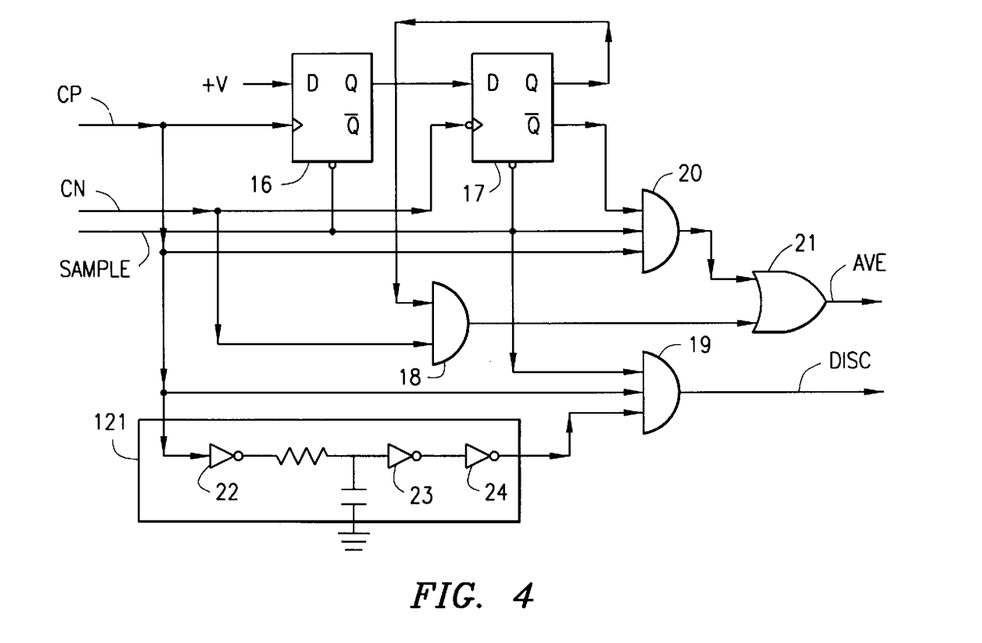
FIG. 4 is a circuit diagram of a preferred embodiment of logic control for the servo-demodulator of FIG. 3.

Referring now to FIG. 4, a preferred embodiment of control logic 7 is represented. Those skilled in the art will recognize that the embodiment can be widely varied. Control logic 7 comprises a first D-type flip-flop 16 activated by a positive edge applied to the clock input, a second flip-flop 17 of the same type but activated by a negative edge applied to the clock input, logic AND gates 18, 19, 20, a logic OR gate 21 and an inverting delay element 121.

Flip-flops 16 and 17 are put in their reset state by the deasserted SAMPLE signal applied to the reset input and receive the signals CP and CN respectively at their clock inputs. Flip-flop 16 has its D input connected to the positive voltage source +V representative of logic level 1. The D input of flip-flop 17 is connected to the Q output of flip-flop 16, its own Q output being connected to one input of AND gate 18 and its inverting output $\overline{Q}$ being connected to one input of AND gate 20. AND gate 18 also receives the signal CN at one input. AND gate 20 also receives the SAMPLE and CP signal at one input.

The outputs of AND gates 18 and 20 are connected to the inputs of OR gate 21 at the output of which the signal AVE is available. AND gate 19 receives at its input the signals SAMPLE, CP and the output signal from the inverting delay element 121. The signal DISC is available at the output of AND gate 19. The inverting delay element 121 can be constituted by an odd number of inverters, such as inverters 22, 23, 24, connected in cascade to increase the delay time, or even, as shown in the drawing, by an odd number of inverters, connected in cascade, with an interposed RC network to introduce a further delay.

Figure 5:
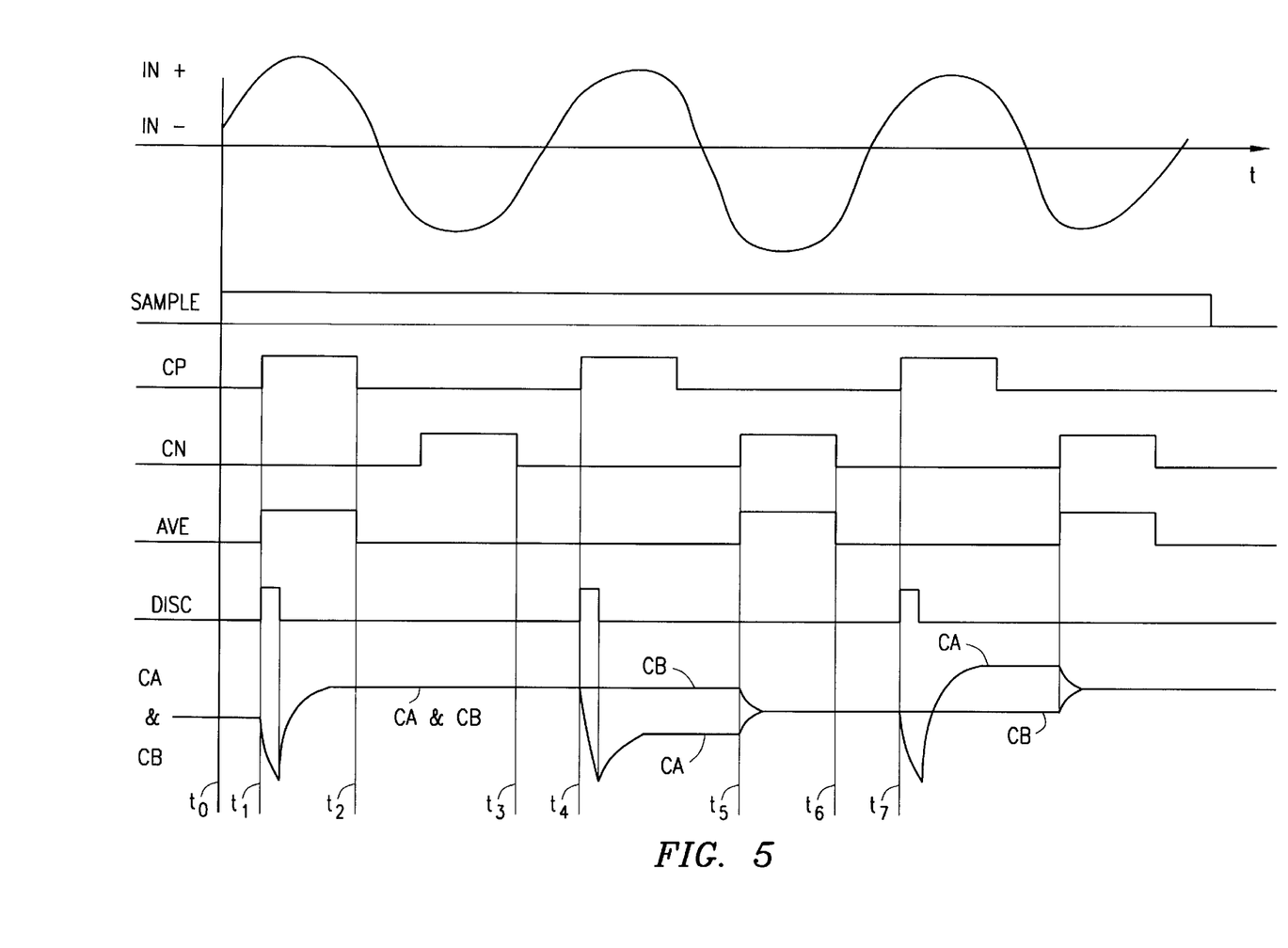
FIG. 5 is a timing diagram showing the functioning of the servo-demodulator of FIG. 3 and represents the level of the signals present at different circuit points.

Referring now to FIG. 5, a timing diagram illustrating the operation of the demodulator of FIG. 3 and its control logic 7, shown in FIG. 4, is shown. Waveform IN+, IN− represents the input voltage applied to the demodulator consequent to reading a servo burst. Waveform SAMPLE represents the logic level of the SAMPLE signal, which can be asserted at any time upon recognition of a "servo burst" field and which is deasserted at the end of the reading of the servo burst field. Waveforms CP, CN, AVE, DISC respectively represent the logic level of the signals CP, CN, AVE, DISC. Finally, waveforms CA, CB represent the charge voltage on capacitors 12 and 9 respectively.

At time t0, in a manner which can be entirely asynchronous with respect to the waveform of the input signal IN+, IN−, the signal SAMPLE is asserted, and at time t1, with the first rising edge of the signal CP, flip-flop 16 is set. Starting at the same time, since flip-flop 17 is still in reset, the signal AVE is asserted, which closes the switch 8. Starting at the same time, a short pulse DISC is also generated which controls the closure of switch 14 and causes at least partial discharge of capacitors 12 and 9. At the end of pulse DISC, both capacitors 12 and 9 charge to a voltage level substantially corresponding to the peak value of the positive half-wave applied to the input of the demodulator (multiplied by the gain of differential amplifier 11, which may be equal to 1). At time t2, with the deassertion of the signal CP, the signal AVE is deasserted, and switch 8 is opened. Capacitors 9 and 12, however, maintain the previously assumed charged state.

The subsequent assertion of the signal CN, which defines a time window in which a negative peak of the input signal to the decoder is contained, does not affect the state of control logic 7, but at time t3, when the voltage of the input signal at the decoder exceeds the predetermined lower threshold value of differential comparator 6, the signal CN is again deasserted and causes flip-flop 17 to set, AND gate 20 to be disabled, and AND gate 18 to be enabled. At time t4, when the voltage of the input signal to the decoder exceeds the predetermined upper threshold value of differential comparator 6, the signal CP is again asserted and defines the beginning of a new time window which contains a positive peak of the input signal. At time t4, a new DISC pulse is generated, which closes switch 14 and causes at least partial discharge of capacitor 12. Capacitor 9, on the other hand, retains the previously imposed charge state. At the end of the pulse DISC, capacitor 12 charges again to a voltage level corresponding to the voltage of the second positive peak of the input signal, and maintains this level until time t5.

At time t5, with a new assertion of the signal CN due to the decrease of the voltage of the input signal beyond the lower threshold of differential comparator 6, the signal AVE is also asserted for the whole of the time that CN is asserted. The assertion of AVE causes closure of switch 8 and obliges capacitors 12 and 9 to assume an equal charge voltage. Clearly, if V1A is the initial charge voltage of capacitor 12, V1B is the initial voltage of the charge of capacitor 9, and CA, CB are respectively the capacitance of capacitors 12 and 9, the capacitors assume a charge voltage:

V2A=V2B=(CA.V1A+CB.V1B)/(CA+CB)

which represents a weighted average of the two initial charge voltages. In particular, if CA=CB, the voltage V2A=V2B=(V1A+V1B)/2 represents the arithmetic mean of the two voltages. For this reason the signal AVE can be defined as an averaging operation activation signal or mean control signal.

At time t6, with deassertion of CN, switch 8 is opened, and with the assertion of CP at a subsequent time t7, capacitor 12 is discharged and then charged to the voltage corresponding to the voltage of a third voltage peak. The subsequent closure of switch 8 causes the two capacitors to assume a charge voltage which is the weighted average (as a function of CA and CB) of the last detected voltage peak and the weighted average of the voltage of the two preceding peaks. The process repeats indefinitely until the signal SAMPLE is deasserted. At this point, the voltage to which capacitor 9 is charged represents a weighted average of the amplitude of a plurality of positive peaks obtained with successive averaging operations.

If x is the number of peaks on which the averaging operation is performed and $Va_n$ with n=1 . . . x the detected amplitude of the various peaks, $Vb_n$ the charge voltage accumulated in capacitor 9 after n charging operations, the resultant weighted average is given by $$Vb_x = \sum_{2}^{x}{}_n (VB_{(n-1)} \cdot CB + Va_n \cdot CA)/(CA + CB)$$

With a demodulator or decoder of the type described in FIG. 3, if n>2, it is not possible to attribute different peak measurements the same weight. In particular, if CA=CB, the last peak measurement has a weight equal to the cumulative weight of all the preceding measurements. Notwithstanding this, it is evident that the possible imprecision in measurement of one of the peaks due to disturbances, even if it is the last peak, influences the cumulative measurement with a lower weight than that which it would have done with a single measurement. In other words, immunity to noise is significantly improved.

With a convenient choice of the ratio between CB and CA greater than 1, for example, equal to 2, 3 or more, and in relation to the number of peaks which contribute to the weighted averaging operation, it is possible to equalize to a large extent the weight of the various peaks in the averaging operation. Once the weighted averaging process has been completed, the charge voltage of capacitor 9 relating to the positive peaks of one of the servo burst signals, can be converted by an A/D convertor 25 with input buffer, stored, and compared with the charge voltage of capacitor 9 resulting from the subsequent execution of a weighted averaging process on the positive peaks of the other of the two servo burst signals, the difference between the two weighted averages being indicative of the offset of the head from the track center.

These operations can be performed in a conventional manner without time limitations imposed by the frequency of the servo burst signals, which would make the analog-to-digital conversion of the amplitude of the different sample peaks, their memorization and subsequent arithmetic averaging in real time, excessively complex and onerous. The demodulator of FIG. 3 performs a weighted average of only positive peaks.

Figure 6:
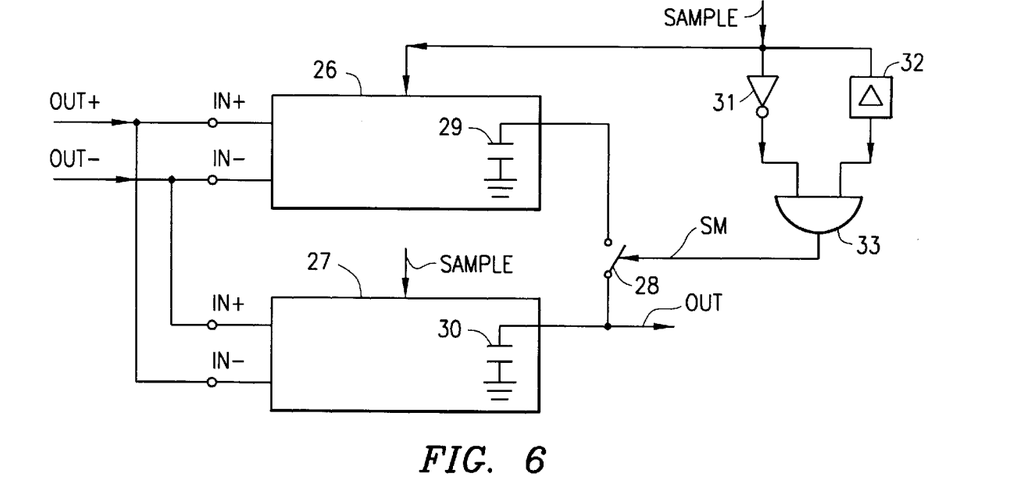
FIG. 6 is a block diagram of a preferred servo-demodulator in accordance with the present invention, for use in particular with read heads of magnetoresistive type and for the demodulation of asymmetrical signals.

A further increase in the precision, which is particularly advantageous if the signal read from the "servo bursts" is asymmetric (as occurs in the case of magnetostrictive read heads), can be achieved as shown in FIG. 6 with a duplication of the demodulator, one of the demodulators being dedicated to the measurement and weighted averaging of the amplitude of positive peaks, the other decoder being dedicated to the measurement and weighted averaging of the amplitude of negative peaks.

In FIG. 6, a first decoder 26, identical to that illustrated in FIG. 3, has its inputs IN+, IN− connected respectively to the outputs OUT+, OUT− of a read head. A second decoder 27, again identical to that illustrated in FIG. 3, has its inputs IN+, IN− connected respectively to the outputs OUT− and OUT+ of the read head, that is with an inversion of the input signal.

It is therefore evident that the identification of the positive and negative peaks being conventional and subordinated to whichever of the terminals OUT+, OUT− is assumed as reference, that the peaks, seen as negative by decoder 26, are seen and treated by decoder 27 as positive peaks while the peaks seen as positive by decoder 26 are seen and treated by decoder 27 as negative peaks.

To perform the averaging, which can be arithmetic, of the weighted averages of the positive and negative peaks respectively, it is sufficient to-provide an electronic switch 28 which connects in parallel output capacitors 29, 30 of the two decoders 26, 27 corresponding to capacitor 9 of FIG. 3.

The switch can be controlled, at the end of the process of forming the weighted average, by a pulse SM obtained, for example, from the SAMPLE signal, when this is deasserted, with a simple logic comprising an inverting element 31, a delay element 32 and an AND gate 33, the SAMPLE signal being input to the inputs of elements 31, 32 and the outputs of elements 31, 32 being connected to the inputs of AND gate 33 at the output of which the signal SM is available for control of switch 28.

Figure 7:
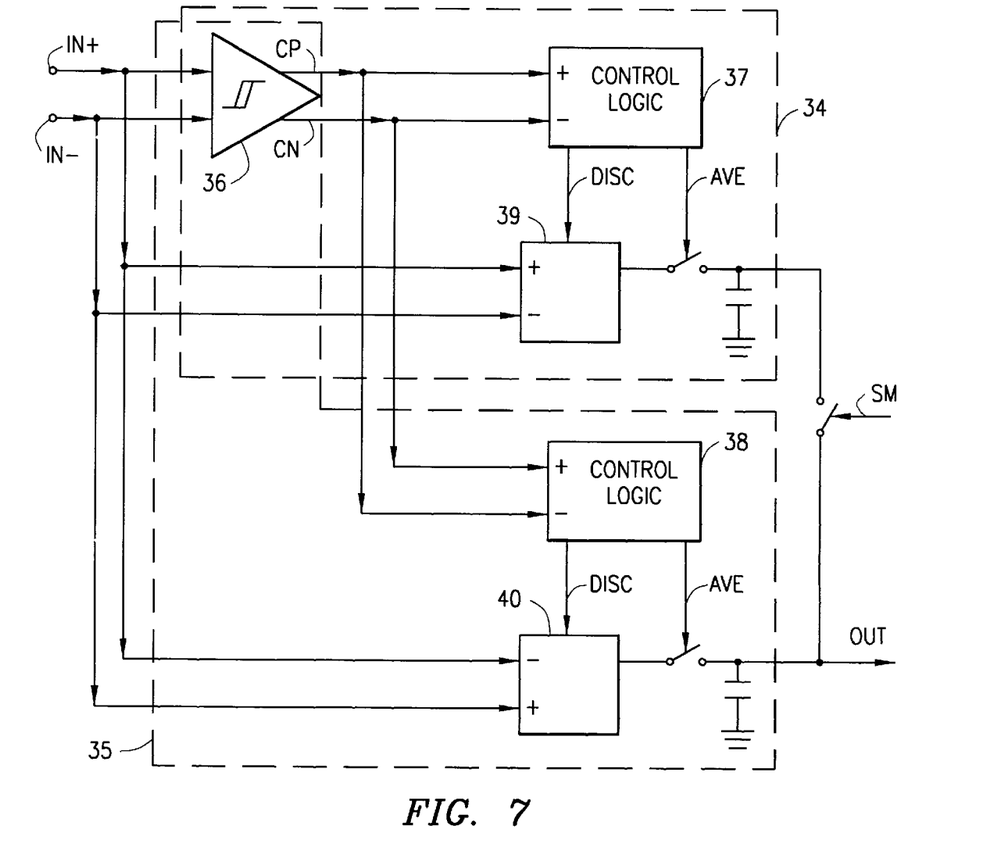
FIG. 7 is an alternate embodiment of the servo-demodulator of FIG. 6.

As shown in FIG. 7, this embodiment can be simplified by forming two decoders 34, 35 in such a way that differential comparator 36 with hysteresis is common to both the decoders. The signals CP and CN at the output from the differential comparator are applied to the inputs of control logic 37 of the first decoder, exactly as in the case of FIG. 3, and to the inputs of control logic 38 of the second decoder with signal reversal.

In the same way, the + and − inputs of peak detector 39 of first decoder 34 are connected to the IN+, IN− inputs, respectively, of the decoder, while the + and − inputs of peak detector 40 of second decoder 35 are connected respectively to the IN− and IN+ inputs with signal reversal. It is therefore evident that the signal CN applied to control logic 38 is seen as a signal which defines a time window containing a positive peak, while correspondingly, a peak contained in this time window is seen and sampled by peak detector 40 as a positive peak.

The preceding description relates only to a preferred embodiment, and it is clear that many variants can be introduced.

For example, differential comparator 6 with hysteresis, in particular in the case when it is necessary to recognize peaks of a single type (positive or negative), can be a simple differential comparator with a single output, for the generation of only one of the signals CP and CN, the other signal being obtained from the first with a simple inversion, or with logic which ensures a time separation between the assertion intervals of the two signals.

Control logic 7, in relation to the possibility of using logic components in which an electrical state can be representative of a logic state, or its inverse, also lends itself to a multiple variety of modifications.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

In the claims:

1. A servo-demodulator for indicating the position of a magnetic disc read head relative to a recorded track on a magnetic disc, comprising:

a pair of input terminals for receiving in succession a pair of variable signals, each variable signal corresponding to a position signal recorded on the magnetic disc and having alternating positive and negative peaks;

a detector circuit for detecting the positive peaks of each of the signals of said pair of variable signals, said detector circuit being connected to said pair of input terminals and having a first sample and hold capacitor and a first normally open reset switch for selectively draining a charge appearing on said first sample and hold capacitor;

means, connected to said pair of input terminals, for generating a first signal, the assertion of which defines a first periodic time window for sampling each of said positive peaks of each of said variable signals, and a second signal, the assertion of which defines a second periodic time window which is offset from said first periodic time window and containing at least one of said negative peaks of each of the variable signals;

a second sample and hold capacitor;

a second normally open switch for connecting said second sample and hold capacitor in parallel with said first sample and hold capacitor when closed; and control means, connected to said means for generating said first signal and said second signal, for producing a sample control signal for controlling the first normally open switch and an averaging control signal for controlling the second normally open switch, said sample control signal being asserted to sample the positive peaks for each of the variable signals on said first sample and hold capacitor, said averaging control signal being asserted to, for each variable signal, average the samples of the positive peaks thereof.

2. The servo-demodulator of claim 1, wherein:

said detector circuit comprises an amplifier with open emitter output stage; and said first sample and hold capacitor is connected between the open emitter of said output stage and ground.

3. The servo-demodulator of claim 1, wherein said means for generating said first signal and said second signal comprises a differential comparator with hysteresis.

4. The servo-demodulator of claim 1, wherein said control means comprises:

first and second flip-flops in a cascade configuration, the first flip flop having a clock input driven by the first signal, the second flip flop having a clock input driven by the second signal and having a D input driven by an output of the first flip flop;

first combinatorial logic for generating said averaging control signal based upon at least one output of the second flip flop and upon the assertion of the first and second signal; and second combinatorial logic for generating said sample control signal based upon the assertion of the first signal and upon a delayed, logically complemented version of the first signal.

5. The servo-demodulator of claim 1, wherein said second sample and hold capacitor has a greater capacitance value than said first sample and hold capacitor.

6. The servo-demodulator of claim 1, further comprising:

a buffer for storing the average of the samples of the positive peaks for one of said variable signals.

7. The servo-demodulator of claim 1, wherein:

the sample control signal is a pulse which is triggered in response to a transition appearing on the first signal.

8. The servo-demodulator of claim 1, wherein:

the averaging control signal is asserted during the assertion of the first signal; and the sample control signal is asserted during the first assertion of the first signal and during assertions of the second signal following the first assertion thereof.

9. The servo-demodulator of claim 1, further comprising:

a means for comparing the average of the samples of the positive peaks for one of said variable signals with the average of the samples of the positive peaks for the other of said variable signals.

10. A device for indicating a position of a read head relative to a track on a magnetic disc, comprising:

a circuit for generating a first input signal and a second input signal in succession, the first and second input signals relating to signals recorded on the magnetic disc, each first and second input signal having alternating positive and negative peaks;

a comparator circuit for generating a first signal which is asserted to correspond to the positive peaks of the first and second input signals and a second signal which is asserted to correspond to the negative peaks of the first and second input signals;

a detector circuit for sequentially detecting the positive peaks of the first and second input signals and including an output and a first capacitor for collecting a charge corresponding to a positive peak for each of the first and second input signals;

a second capacitor;

control logic, responsive to the first and second signals, for generating a reset control signal for selectively discharging the capacitor of the detector circuit and an averaging control signal for selectively connecting the first capacitor and the second capacitor in parallel, a charge on the second capacitor representing, for each first and second input signals, an average of the positive peaks thereof;

a buffer for selectively storing an electrical signal corresponding to the charge stored on the second capacitor; and a means for comparing a charge stored on the second capacitor with the electrical signal stored in the buffer, the comparison being indicative of a position of the read head relative to the track on the magnetic disc.

* * * * *

UNITED STATES PATENT AND TRADEMARK OFFICE
CERTIFICATE OF CORRECTION

PATENT NO. : 6,002,542
DATED : December 14, 1999
INVENTOR(S) : Bruccoleri et al.

It is certified that error appears in the above-identified patent and that said Letters Patent is hereby corrected as shown below:

Title page, item

[75] Inventors: Replace "Melchiorre Bruccoleri, Genoa" with "Melchiorre Bruccoleri, Genova".

Item
[56] References Cited: Other Publications: Replace "Patent Abstract of Japan, of JP7201146 Head Positioning Control Device of Magnetic Disk Device and Method Thereor, Masahiko Aug. 4, 1995." with "Patent Abstract of Japan ,of JP7201146 Head Positioning Control Device of Magnetic Disk Device and Method Therefor, Masahiko Aug. 4, 1995.".

Signed and Sealed this

Twenty-fifth Day of July, 2000

Attest:

Q. TODD DICKINSON

*Attesting Officer*           *Director of Patents and Trademarks*